United States Patent [19]
Meyer

[11] Patent Number: 5,927,223
[45] Date of Patent: Jul. 27, 1999

[54] SEALING PLUG INSERTION SYSTEMS

[76] Inventor: Ross E. Meyer, 1920 Camino Mora, Los Alamos, N.M. 87544

[21] Appl. No.: 08/859,002

[22] Filed: May 16, 1997

[51] Int. Cl.⁶ ..................................................... B63B 43/16
[52] U.S. Cl. ......................................... 114/227; 29/402.01
[58] Field of Search ..................................... 114/227, 229, 114/228; 29/402.01, 402.09, 402.14

[56] References Cited

U.S. PATENT DOCUMENTS

| | | | |
|---|---|---|---|
| 3,053,282 | 9/1962 | Fox | 114/227 |
| 3,841,256 | 10/1974 | Etchelecou et al. | 114/227 |

*Primary Examiner*—Sherman Basinger
*Attorney, Agent, or Firm*—Ray G. Wilson

[57] ABSTRACT

A sealing system provides for plugging holes in a ferromagnetic tank structure. A tripod has variable length legs for placing on a curved or irregular surface of the tank structure. A permanent magnet assembly is attached to each one of the variable length legs for removably attaching the legs individually to the ferromagnetic tank structure. An actuator is mounted in the tripod for positioning over the hole for movement generally perpendicular to the tank structure in which the hole is located. A clamping plug is mounted on the actuator for insertion into and sealing the hole.

23 Claims, 10 Drawing Sheets

SEALING PLUG INSERTION SYSTEMS

BACKGROUND OF THE INVENTION

This invention relates to devices for plugging holes, and, more particularly, to devices for plugging holes in ferromagnetic tanks.

Ferromagnetic tank structures are used throughout the world to store liquids, many of them hazardous to the environment. A particularly complex tank structure is formed by the hull of an ocean-going tanker, where such tankers can be super tankers that carry millions of gallons of hydrocarbon products, e.g., crude oil, gasoline, and chemicals. Each year there are numerous leaks from tankers, barges, and the like, with resulting damage to sensitive ecological systems and pollution of waterways. Statistics show that some 16,000 incidents occur each year with a release of 41,000,000 gallons released to the environment.

Leaks may occur from a number of sources, such as leaking fittings, small punctures, large tears in the side of the structure, and, increasingly, from fixed or drifting mines. By way of example, U.S. Pat. No. 5,355,824, to Meyer et al., incorporated by reference, teaches a framed bladder structure that can cover a large area and be attached to a ferromagnetic tank, such as the hull of a ship, by permanent magnets that be selectively placed in magnetic proximity to the tank surface for holding the framed bladder in place and forming a seal around the leak. In many instances, however, the leak may be from a fitting or fluid outlet formed in the structure or from a relatively small puncture of the tank. Then, a large area seal is not required, and it would be desirable to have available a simple device for sealing within a fitting outlet or a puncture.

It will be appreciated that the hydrostatic pressure of the liquid within a tank structure or exiting from a fitting outlet may be greater than the surrounding hydrostatic pressure. Under this condition it is difficult or impossible to manually approach and insert a sealing device within the breach or opening. Even a small device cannot be readily held in position to form a seal.

Accordingly, it is an object of the present invention to provide an insert for sealing within conventional fitting outlets and puncture-type penetrations in ferromagnetic tank structures, and particularly ship hulls.

Another object of the present invention is to provide a structure to assist in placing a sealing insert within a fitting outlet or puncture-type penetration against a hydrostatic pressure head.

One other object of the present invention is to anchor an insert placement structure to the tank surface while placing the sealing insert.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a sealing system for plugging holes in a ferromagnetic tank structure. A tripod has variable length legs for placing on a curved or irregular surface of the tank structure. A permanent magnet assembly is attached to each one of the variable length legs for removably attaching the legs individually to the ferromagnetic tank structure. An actuator means is mounted in the tripod for positioning over the hole for movement generally perpendicular to the tank structure in which the hole is located. A clamping plug is mounted on the actuator means for insertion into and sealing the hole.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

A sealing system is provided for plugging holes in ferromagnetic tank structures, such as ocean-going tankers, barges, land-based steel tanks, and the like. A structure is attached to the tank structure to center an actuator above a hole in the tank and to permit a force to be exerted to counter the hydrostatic pressure of the fluid in the tank. The actuator then inserts a clamping plug into the hole wherein actuation of the plug serves to clamp the plug within the hole and to seal the hole. It will be appreciated that holes can be plugged from either the outside of a structure, or the inside of a structure such as a ship hull.

Figure 1:
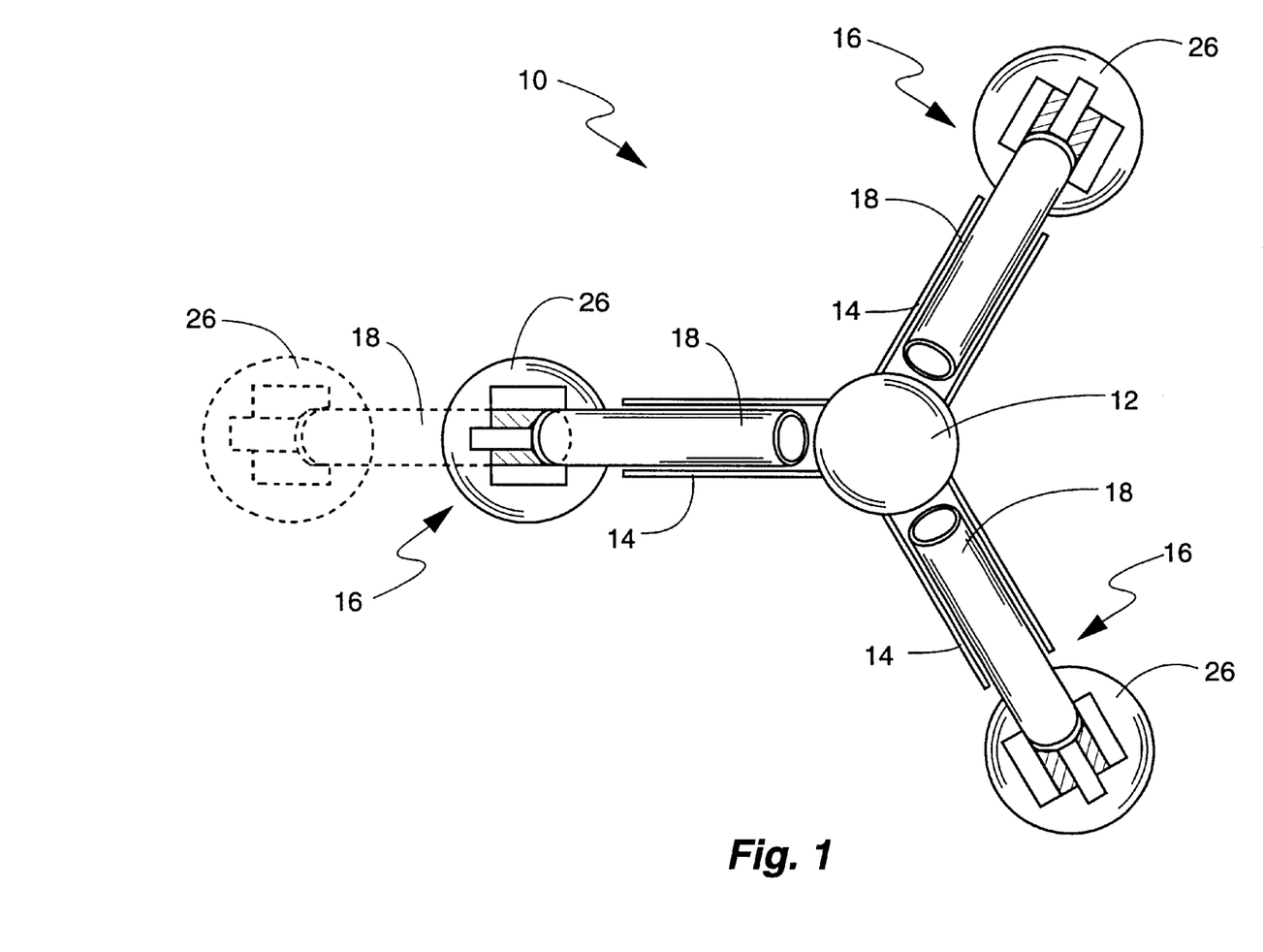
FIG. 1 is a top pictorial illustration of a tripod structure according to one embodiment of the present invention.

Referring first to FIG. 1, there is shown a pictorial illustration, in top view, of a tripod assembly 10 according to the present invention. Hub assembly 12 acts to hold an actuator assembly, discussed below, and has mounting brackets 14 depending therefrom to engage tripod leg assemblies 16. Each tripod leg assembly 16 is extendible to different lengths, such as with telescoping tubing 18, but any suitable means for providing length extensions is acceptable for use herein. A permanent magnet assembly 26 is rotatably attached to each leg to attach the leg to the ferromagnetic tank surface. As described herein, permanent magnet assembly 26 may be formed from a cammed structure, such as described in U.S. Pat. No. 5,192,155 to Meyer, incorporated herein by reference. In another embodiment, the cam structure provides equal offsets so that magnet assembly 26 attaches to a tank structure without rotation. Another suitable detachable magnet is described in U.S. Pat. No 5,355,824, to Meyer et al., incorporated herein by reference, where a rotating magnet structure is described to provide a magnetic "short" for releasing the magnet.

Figure 2:
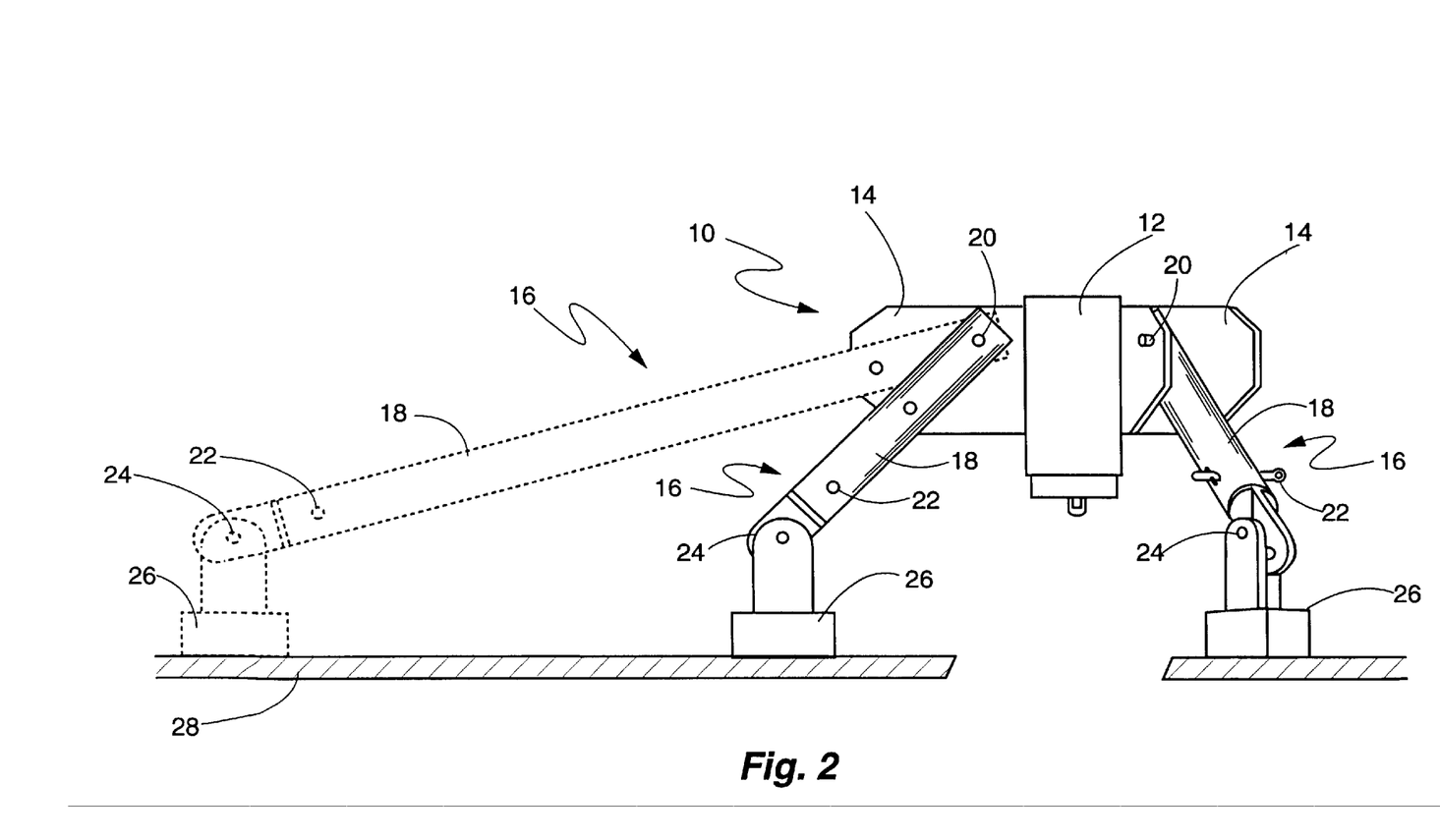
FIG. 2 is a side pictorial illustration of a tripod structure according to one embodiment of the present invention.

FIG. 2 is a pictorial illustration in side view of tripod assembly 10 shown in FIG. 1. Mounting brackets 14 depend from hub assembly 12 and support leg assemblies 16 with rotatable supports 20, e.g., a pin assembly. Each leg assembly 16 includes an extendable leg 18, which may be a telescoping tubing or other form of extendable assembly. Once a suitable length is determined for a leg assembly 16 the leg is locked at the determined length, such as by locking with extension pin 22. At the end of leg assembly 16 that is opposite rotatable support 20, rotatable mounting 24 permits magnet assembly 26 to rotate into engagement with the surface of container 28. When magnet assemblies 26 are actuated to magnetically attach to container 28, tripod assembly 10 is securely fixed to container 28. It will be appreciated that the extendable and rotatable leg assemblies 16 and rotating attachment magnets 26 permit tripod assembly 10 to be fixed to a curved or uneven surface while hub assembly 12 is centered over a hole or breach in container 28.

Figure 3A:
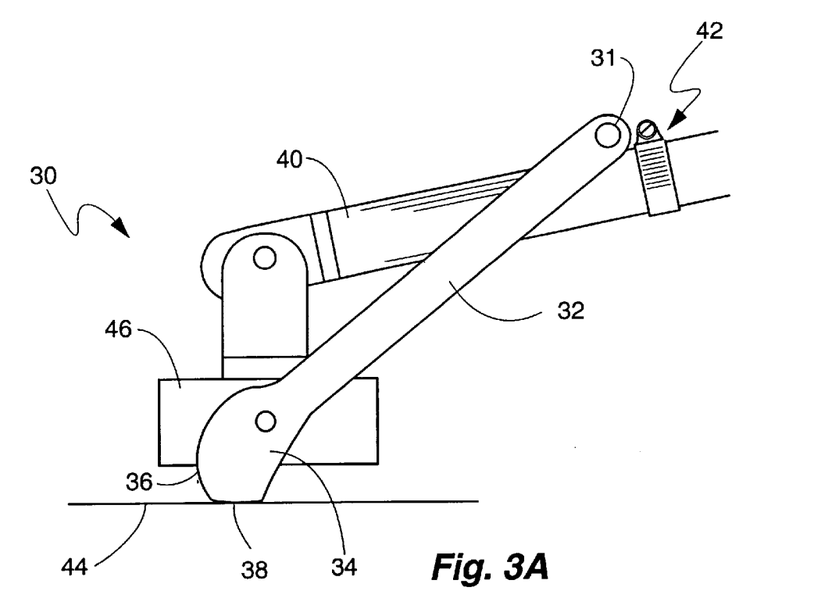
FIGS. 3A and 3B are pictorial illustrations of a cammed magnetic assembly detached and attached to a tank structure, respectively.
Figure 3B:
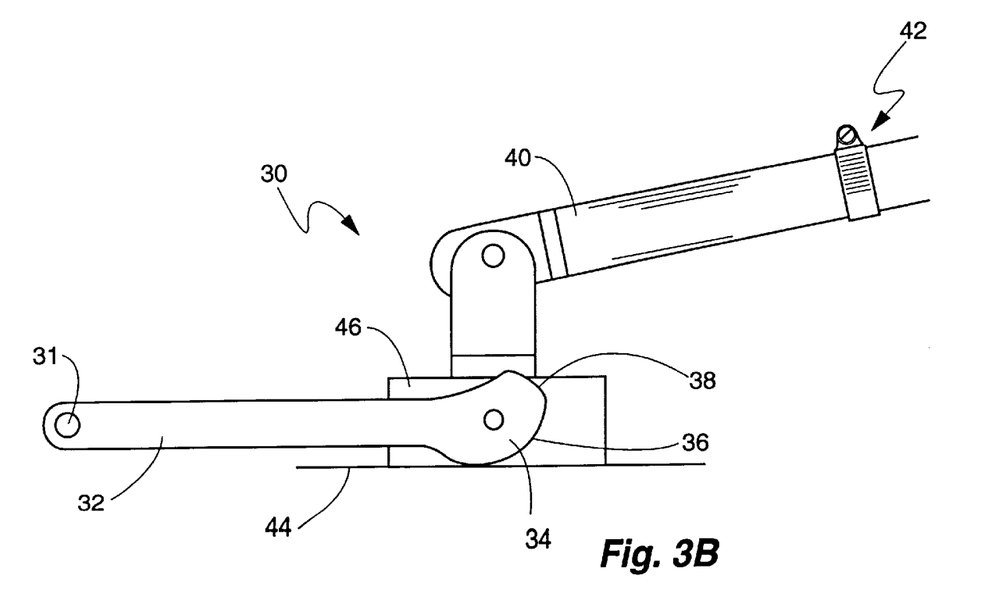

FIGS. 3A and 3B are pictorial illustration in side view of cammed magnet assembly 30 for placing and lifting a magnetic device from the surface of a ferromagnetic surface 44. Rotatable arm 32 is formed with handle 31 at one end and cam 34 at the other end. When tripod assembly 10 (FIG. 1) is being installed, rotatable arm 32 is locked to tripod leg 40 by, e.g., a locking clip 42, which may be moved along tripod leg 40 depending on the final angle configuration. In the locked position, cam surface 36 is rotated to place the long dimension of the cam, which may be a flat surface 38, in contact with container 44. In the unlocked position, rotatable arm 32 is rotated to lower magnet 46 into magnetic engagement with container 44.

Figure 4A:
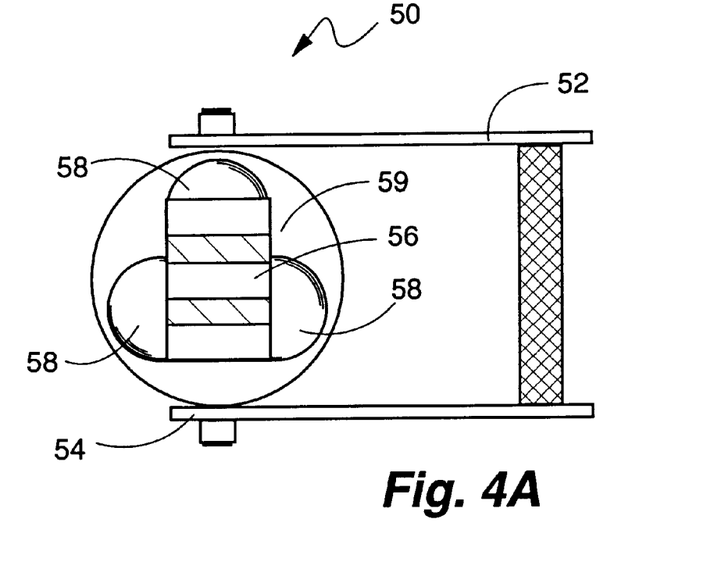
FIGS. 4A–4E are top views of various magnet assemblies according to one embodiment of the present invention for attaching a tripod to a ferromagnetic tank structure.
Figure 4B:
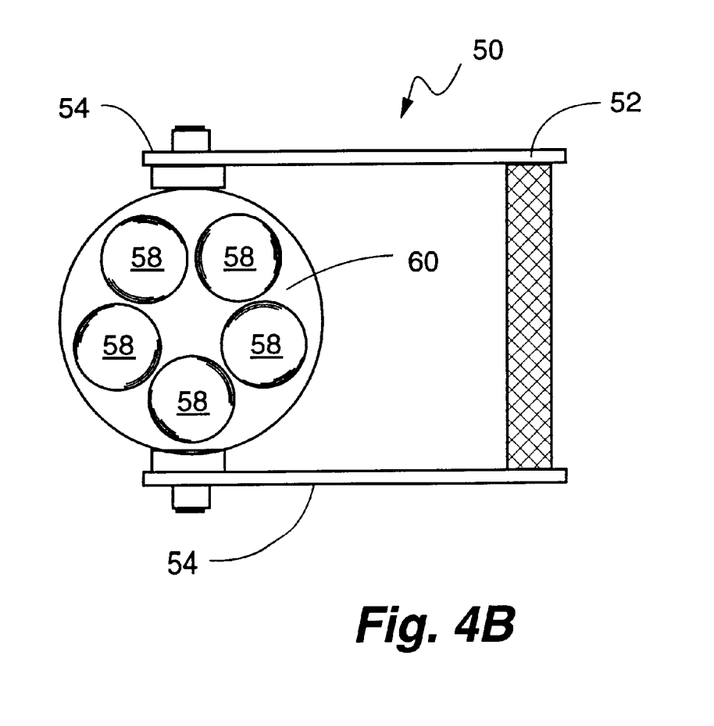

It is a feature of the present invention that a variety of magnet holding strengths may be provided through variations of a basic magnet design. Referring now to FIGS. 4A–4E, FIG. 4A is a top view of a basic magnet assembly 50. In this configuration, handle 52 with cams 54 is rotatably mounted to magnet holder assembly 59, which is sized to hold a selected number of magnets, e.g., three magnets 58, as shown in FIG. 4A. FIG. 4B illustrates the basic magnet assembly 50, with an assembly of five magnets 58 in magnet holder assembly 60.

Figure 4C:
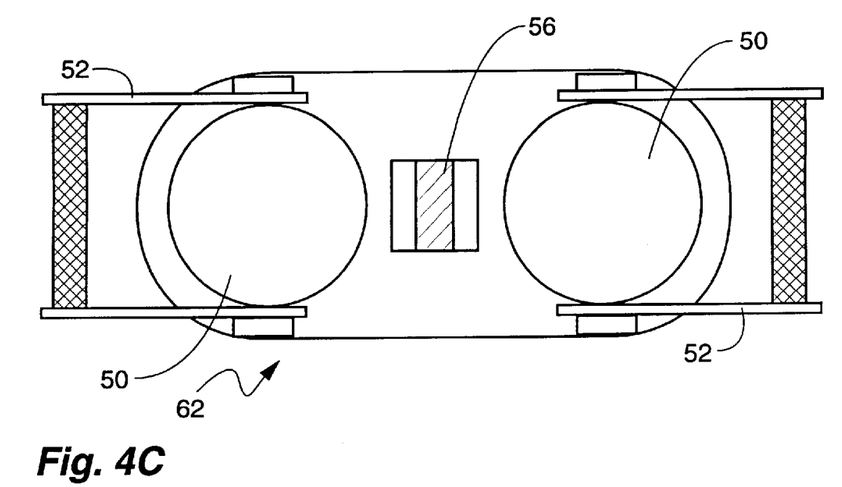
Figure 4D:
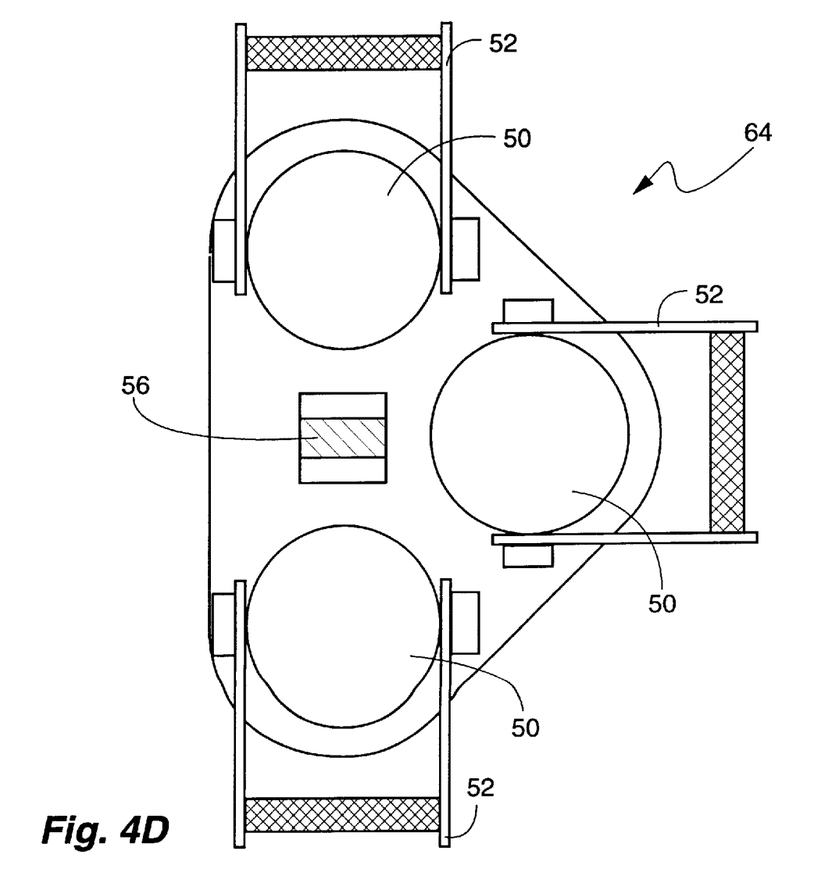
Figure 4E:
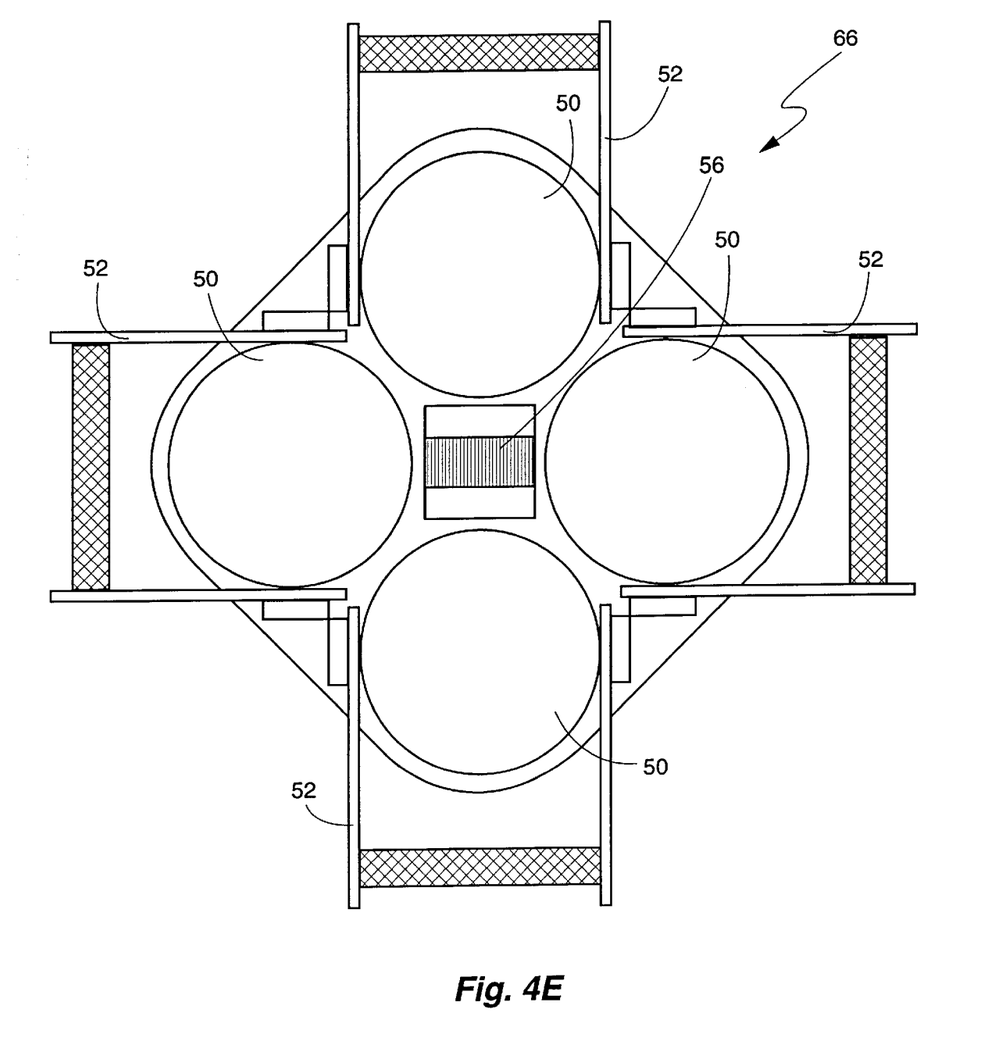

To further increase the holding strength of the magnets, multiple units of basic magnet assembly 50 (FIGS. 4A and 4B) may be assembled, as shown in FIGS. 4C, 4D, and 4E. FIG. 4C indicates frame assembly 62 with two basic magnet assemblies 50. Mounting bracket 56 provides a rotatable mounting on tripod legs 16 (FIG. 1). FIG. 4D illustrates frame assembly 64 for mounting three basic magnet assemblies 50. FIG. 4E illustrates frame assembly 66 for mounting four basic magnet assemblies 50.

Figure 5:
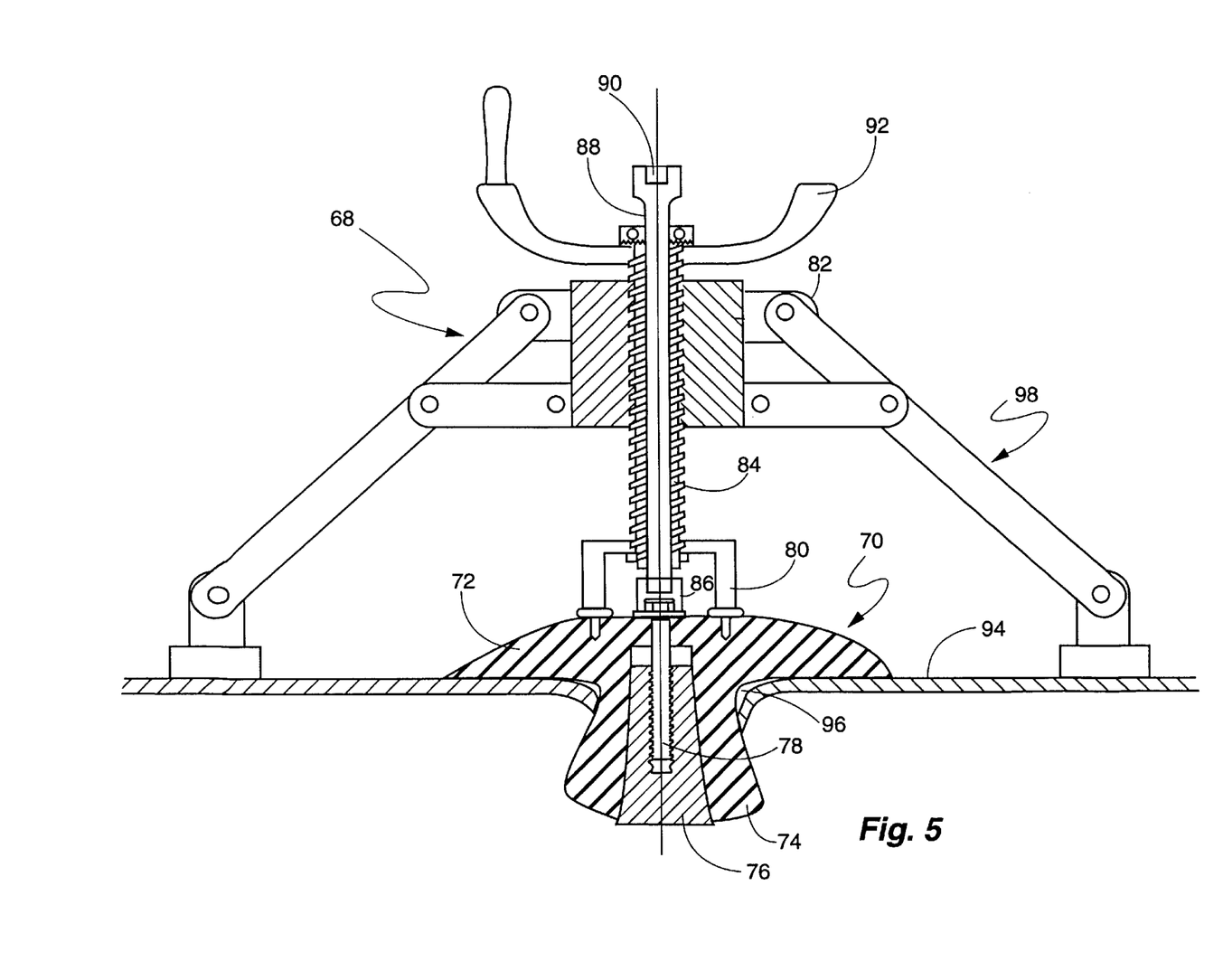
FIG. 5 is a cross-section of one embodiment of an expandable clamping plug with an insertion and expanding tool attached to a tripod.

In accordance with the present invention, tripod assembly 10 (FIG. 1) is anchored by magnet assemblies 26 to the surface of container structure over a breach in the structure. The anchored tripod assembly 10 is then used to exert a force needed to insert a seal device into over the breach. FIG. 5 is a cross-sectional representation of a first plug 70 and installation mechanism 68 supported by hub assembly 82 mounted on tripod legs 98. Plug 70 is an expandable plug having an external seal and support 72 for bearing and sealing against the surface of container 94 and an expanding grommet 74 that extends through hole or breach 96 in container 94. Seal 72 and grommet 74 may be formed as an integral unit from any suitable elastomeric material.

In the expanding embodiment shown in FIG. 5, grommet 74 defines a generally cylindrical cavity having an axis perpendicular to the surface of container 94 when installed and open to the interior of container 94. Moveable cone 76 is generally a frusto-conical shape with a small end having a diameter that fits within the internal opening of the cylinder defined by grommet 74 and defining internal threads for accepting rotatable screw 78. Cone 76 is formed of a rigid material, such as plastic or a corrosion resistant metal. Screw 78 is rotated to draw cone 76 into grommet 74 so that the expanding diameter of cone 76 forces grommet 74 to expand. As grommet 74 expands, grommet 74 draws seal 72 against the surface of container 94 to form a seal and also fills hole 96 to form a plug.

Plug installation mechanism 68 functions to both insert plug 70 into hole 96 and to draw cone 76 into grommet 74. Screw 78 extends through seal cap 72 and terminates at socket 86 that mates with a corresponding head of shaft 88. Shaft 88 rotates within jack screw 84 and terminates in external socket 90. Jack screw 84 has external threads that screw through internal threads of hub assembly 82 and can be rotated with crank handle 92. Jack screw 84 also supports and rotates within plug handle 80, which bears against seal 72 to force plug 70 into hole 96. A conventional socket wrench or the like mates with external socket 90 to rotate shaft 88, which, in turn, rotates screw 78 to extend or withdraw cone 76 within grommet 74. Crank 92 is rotated to screw jack screw 84 towards container 94 and move plug 70 into sealing engagement with hole 96. After cone 76 has been drawn into grommet 74, plug installation mechanism 68 is simply removed from above plug 70 when tripod 98 is removed from container 94.

Figure 6:
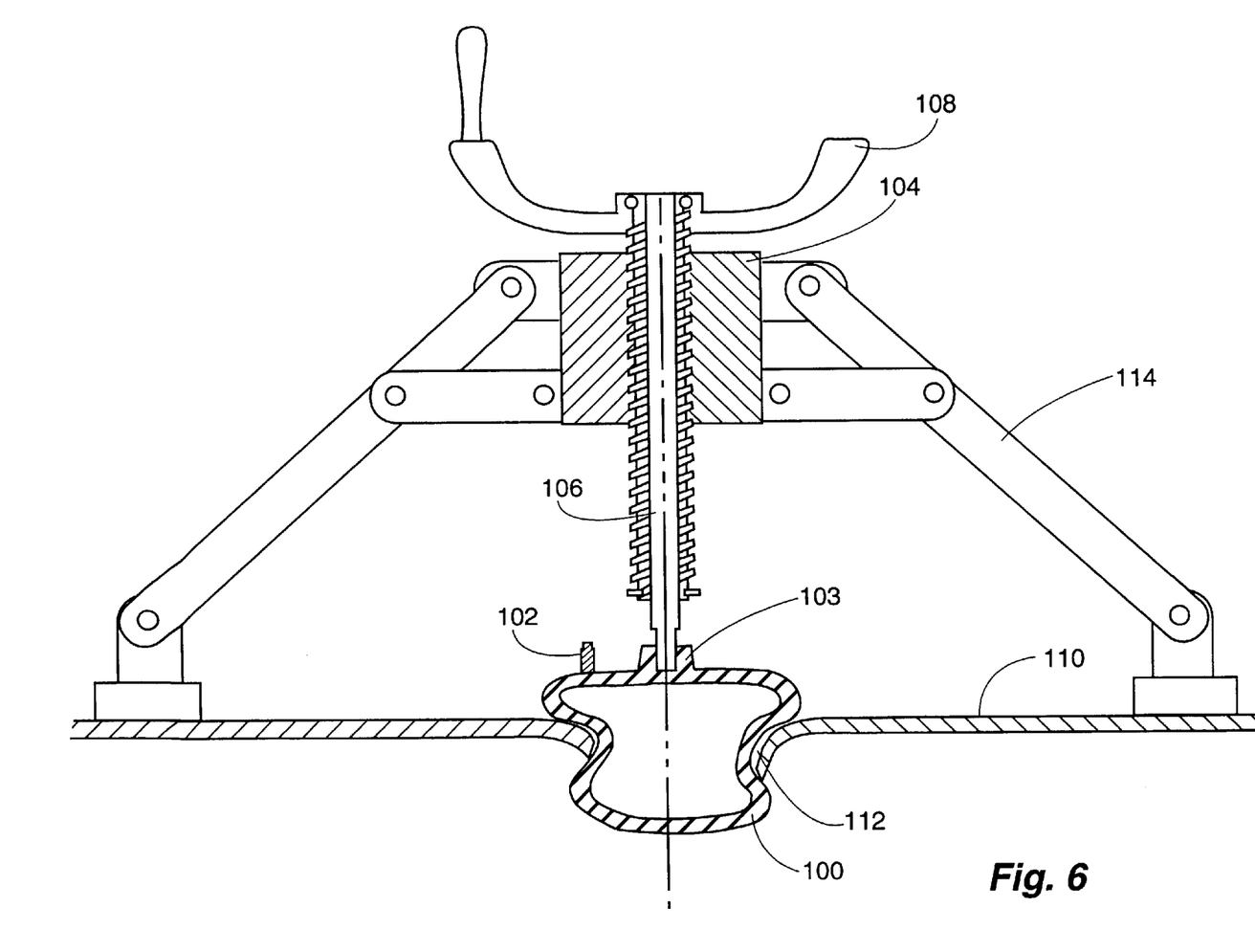
FIG. 6 is a cross-section of one embodiment of an inflatable clamping plug with an insertion tool attached to a tripod.

FIG. 6 is a cross-section of another embodiment of an expanding plug assembly. Tripod leg assembly 114 supports threaded hub assembly 104 above a breach 112 in container 110. In this embodiment, the plug is formed as an expandable bladder 100 with an external socket 103 that mates with jack screw 106. Crank 108 is fixed to jack screw 106 and is rotated to force bladder 100 within breach 112 so that a first portion of bladder 100 extends through breach 112 and a second portion remains on the outside of container 110. Valve stem 102 is inserted in the exterior portion of bladder 100 so that bladder 100 can be pressurized after it is inserted into breach 112. The effect of pressurizing bladder 100 is to expand both the first and second portions so that the portion extending through container 110 expands to fill breach 112 and draws the second portion against container 110 to form an external seal. Expanding bladder 100 is especially suited for irregularly shaped breaches since the bladder can conform to the shape of the breach.

Figure 7:
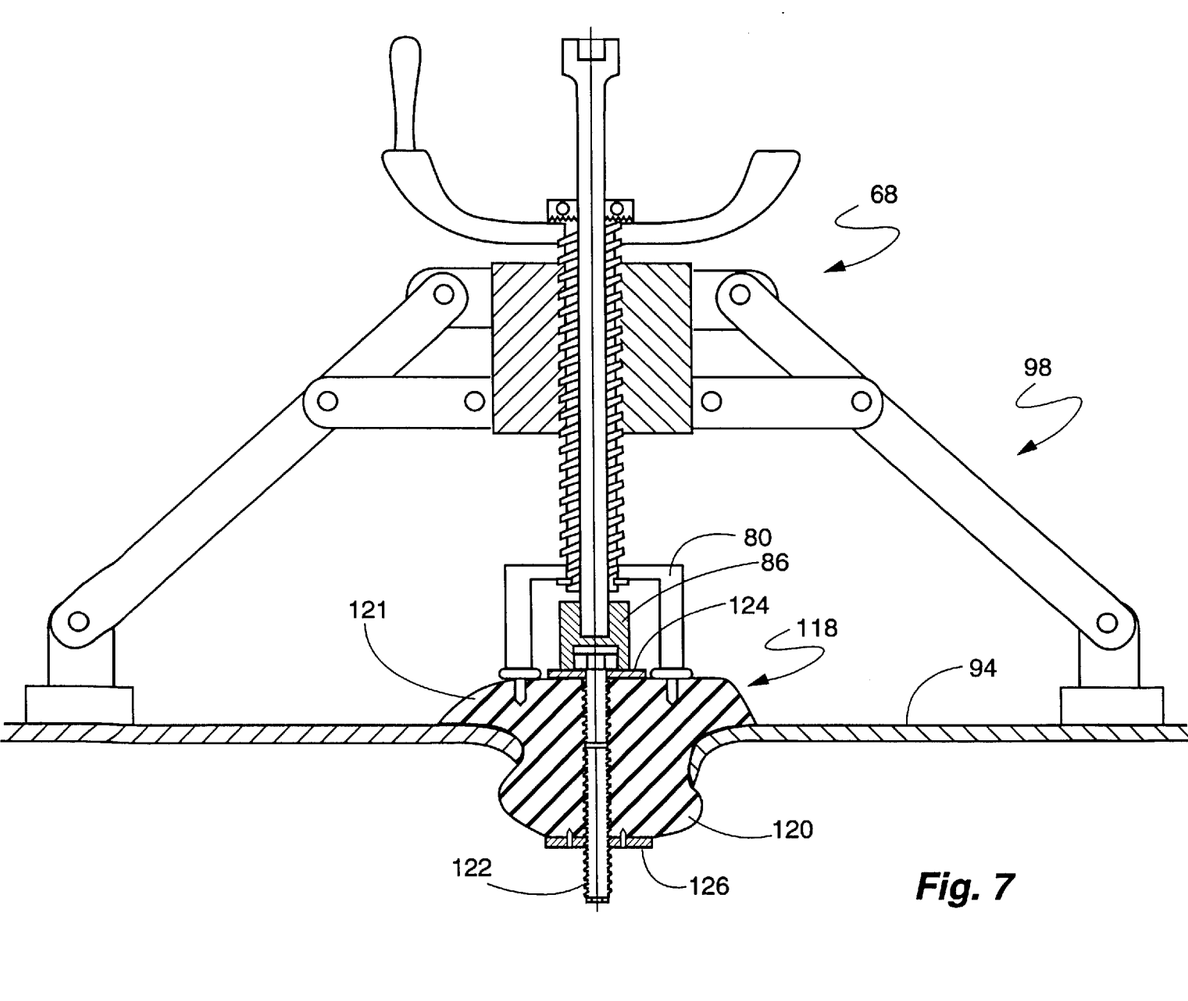
FIG. 7 is a cross-section of one embodiment of a compressible clamping plug with an insertion and compressing tool attached to a tripod.

FIG. 7 is a cross-section of a compressible plug 118 that can be used to clamp within and seal a breach of a container 94 of a ferromagnetic material. Tripod structure 98 is attached to container 96, as explained for FIGS. 1 and 5. Compressible plug 118 is preferably formed from an elastomeric material and includes a seal cap portion 121 and a compressible grommet portion 120. Rigid metal washer 124 is affixed to seal cap portion 121 of plug 118 and serves as a pressure plate for compressing plug grommet portion 120. A threaded pressure plate 126 is affixed to grommet portion 120. Threaded bolt 122 extends through pressure plate 124 and has a head that bears against pressure plate 124. The threads of bolt 122 engage the threads of threaded pressure plate 126.

Plug installation mechanism 68 engages plug 118 as explained with reference to FIG. 5 for plug assembly 70. Handle 80 mates with sealing cap 121 and socket 86 engages the head of bolt 122. Bolt 122 is initially extended through threaded plate 126 so that grommet 120 is elongated with relatively small diameter for inserting into the breach in container 94.

To install plug 118, tripod assembly 98 is magnetically attached to container 94 and plug installation mechanism 68 is centered over the breach and engaged with plug 118. As explained with reference to FIG. 5, plug 118 is inserted into the breach and bolt 122 is rotated to draw pressure plate 126 toward pressure plate 124 to compress grommet 120. As grommet 120 is compressed, the elastomeric material expands, acting to draw seal cap portion 121 against container 94 to form an external seal and to exert a wedging action to clamp plug 118 within container 94.

Figure 8:
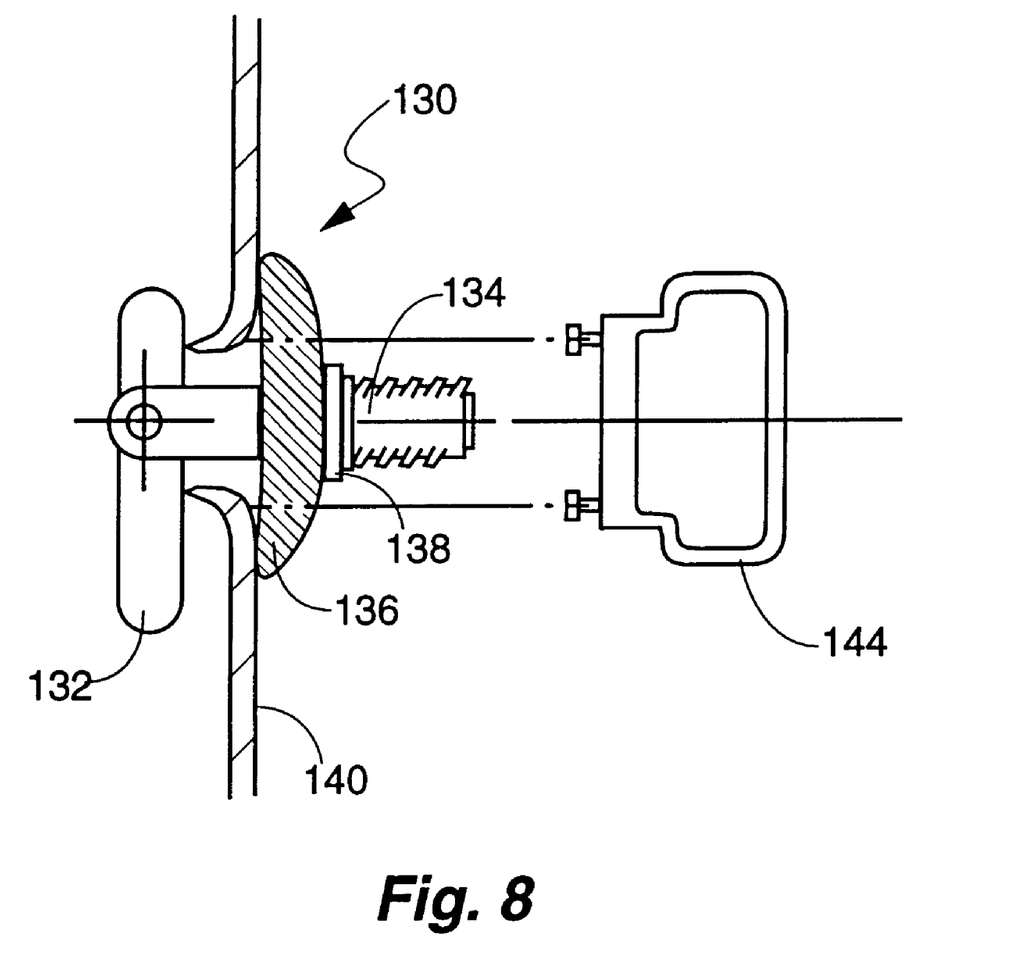
FIG. 8 is a cross-section of a clamping plug with a rotating clamping member.

Yet another embodiment of clamping plug, for use with the tripod assembly 98 and plug installation mechanism 68 described for FIG. 5, is shown in FIG. 8. Clamping seal 130 includes external seal member 136 with threaded washer 138 centrally located and fixed to seal member 136. Seal member 136 is preferably formed of an elastomeric material effective to seal against the surface of container 140. Threaded shaft 134 includes a threaded portion that engages threaded washer 138 and a slotted shank portion that is extendible within a breach through container 140. Rotating clamp 132 is rotatably fixed within the slotted shank of threaded shaft 134.

Installation mechanism 68 (FIG. 5) may be used to install clamping seal 130. Handle 144 is detachably mounted to external seal 136 and is mounted to installation mechanism 68 as shown in FIGS. 5 and 7. Threaded shaft 134 is rotated by installation mechanism 68 so that threaded shaft 134 is withdrawn into seal cap 136 to maintain rotating clamp 132 parallel with shaft 134 for insertion within a breach in container 140. When shaft 134 is placed within container 140, shaft 134 is rotated to extend rotating clamp 132 into container 140 so that rotating clamp 132 is rotated by gravity to a position perpendicular to shaft 134. Shaft 134 is then rotated to move rotating clamp 132 to engage the edges of the breach in container 140 and compress external seal 136 against container 140 to form a seal above the breach and to clamp external seal 136 to container 140.

It will be understood that the plug devices described herein are not intended to be permanent repairs. In some instances, the plugs may be applied to a container, e.g., the hull of a ship in a shipyard, to form a temporary seal while repairs on other container components are carried out. In other instances, the plug is applied at sea to seal a breach, e.g., from a failed component or a failed weld, or from a puncture, so that the ship can be moved to a shipyard for a permanent repair. The magnetically attached tripod and screw actuated plug installation assemblies enable a plug to be moved against substantial hydrostatic pressures into a breach and held in position while the plug is actuated to seal the breach. Each plug includes an external seal portion to seal over the breach and an internal portion acting to clamp the external seal to the container and, in some instance, to further plug the breach. The clamped plugs are then fixed in place so that the tripod structure can be removed and the ship moved through the water.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A sealing system for plugging holes in a ferromagnetic tank structure, including:
    a tripod having variable length legs;
    a permanent magnet assembly attached to each one of said variable length legs for removably attaching said legs individually to said ferromagnetic tank structure;
    actuator means mounted in said tripod for positioning over said hole for movement perpendicular to said tank structure in which said hole is located; and
    a clamping plug assembly mounted on said actuator means for insertion into and sealing said hole.

2. A sealing system according to claim 1, wherein said permanent magnet assembly includes:
    at least one permanent magnet; and
    a rotatable lever arm connected to said at least one permanent magnet and defining a cam surface for raising and lowering said at least one permanent magnet adjacent said tank structure.

3. A sealing system according claim 2, wherein said clamping plug assembly includes:
    a sealing cap for sealing against surface portions of said ferromagnetic tank structure adjacent said hole;
    a sealing grommet formed with said sealing cap for insertion within said hole, said grommet defining an internal cavity; and
    a wedge structure movable within said internal cavity and shaped to expand said grommet within said hole as said wedge structure is moved within said internal cavity to clamp said sealing cap to said tank structure while expanding said grommet within said hole.

4. A sealing system according to claim 2, wherein said clamping plug assembly includes:
    a sealing cap for sealing against surface portions of said ferromagnetic tank structure adjacent said hole;
    a sealing grommet formed with said sealing cap for insertion within said hole, said grommet defining an internal cavity; and
    a threaded washer engaging said grommet and axially aligned with said internal cavity.

5. A sealing system according to claim 2, wherein said clamping plug assembly includes:
    a sealing cap for sealing against surface portions of said ferromagnetic tank structure adjacent said hole;
    an inflatable bladder for inserting within said hole; and
    valve means connected to said inflatable bladder for introducing an inflating fluid within said bladder to expand said bladder for sealing within said hole and clamping said sealing cap above said hole.

6. A sealing system according to claim 1, wherein said actuator means includes a jack assembly for engaging and moving said clamping plug assembly.

7. A sealing system according to claim 6, wherein said jack assembly includes:
    a threaded hub assembly supported by said tripod; and
    a jack screw rotating within said threaded hub assembly for moving said clamping plug assembly.

8. A sealing system according to claim 7, wherein said clamping plug assembly includes:
   a sealing cap for sealing against surface portions of said ferromagnetic tank structure adjacent said hole;
   a sealing grommet formed with said sealing cap for insertion within said hole, said grommet defining an internal cavity; and
   a wedge structure movable within said internal cavity and shaped to expand said grommet within said hole as said wedge structure is moved within said internal cavity to clamp said sealing cap to said tank structure while expanding said grommet within said hole.

9. A sealing system according to claim 7, wherein said clamping plug assembly includes:
   a sealing cap for sealing against surface portions of said ferromagnetic tank structure adjacent said hole;
   a sealing grommet formed with said sealing cap for insertion within said hole, said grommet defining an internal cavity; and
   a threaded washer engaging said grommet and axially aligned with said internal cavity.

10. A sealing system according to claim 7, wherein said clamping plug assembly includes:
    a sealing cap for sealing against surface portions of said ferromagnetic tank structure adjacent said hole;
    an inflatable bladder for inserting within said hole; and
    valve means connected to said inflatable bladder for introducing an inflating fluid within said bladder to expand said bladder for sealing within said hole and clamping said sealing cap above said hole.

11. A sealing system according to claim 7, wherein said clamping plug assembly includes:
    a sealing cap for sealing against surface portions of said ferromagnetic tank structure adjacent said hole;
    a threaded washer mounted within said sealing cap;
    a threaded bolt having an engaging portion extending above said sealing cap, a threaded shaft portion engaging said threaded washer, and a slotted portion having a rotating arm mounted therein to rotate to a position perpendicular to said slotted portion when said slotted portion is inserted through said hole.

12. A sealing system according to claim 7, wherein said jack screw includes a rotatable internal shaft for engaging and expanding said clamping plug assembly.

13. A sealing system according to claim 12, wherein said clamping plug assembly includes:
    a sealing cap for sealing against surface portions of said ferromagnetic tank structure adjacent said hole;
    a sealing grommet formed with said sealing cap for insertion within said hole, said grommet defining an internal cavity; and
    a wedge structure movable within said internal cavity and shaped to expand said grommet within said hole as said wedge structure is moved within said internal cavity to clamp said sealing cap to said tank structure while expanding said grommet within said hole.

14. A sealing system according to claim 13, further including a screw having a head portion engaging said rotatable internal shaft and a threaded portion engaging said wedge structure for moving said wedge structure within said internal cavity of said sealing grommet.

15. A sealing system according to claim 12, wherein said clamping plug assembly includes:
    a sealing cap for sealing against surface portions of said ferromagnetic tank structure adjacent said hole;
    a sealing grommet formed with said sealing cap for insertion within said hole, said grommet defining an internal cavity; and
    a threaded washer engaging said grommet and axially aligned with said internal cavity.

16. A sealing system according to claim 15, further including a bolt having a head portion engaging said rotatable internal shaft and a threaded portion engaging said threaded washer so that rotating said bolt moves said threaded washer toward said sealing cap over said hole to compress and expand said grommet within said hole.

17. A sealing system according to claim 6, wherein said clamping plug assembly includes:
    a sealing cap for sealing against surface portions of said ferromagnetic tank structure adjacent said hole;
    a sealing grommet formed with said sealing cap for insertion within said hole, said grommet defining an internal cavity; and
    a wedge structure movable within said internal cavity and shaped to expand said grommet within said hole as said wedge structure is moved within said internal cavity to clamp said sealing cap to said tank structure while expanding said grommet within said hole.

18. A sealing system according to claim 6, wherein said clamping plug assembly includes:
    a sealing cap for sealing against surface portions of said ferromagnetic tank structure adjacent said hole;
    a sealing grommet formed with said sealing cap for insertion within said hole, said grommet defining an internal cavity; and
    a threaded washer engaging said grommet and axially aligned with said internal cavity.

19. A sealing system according claim 6, wherein said clamping plug assembly includes:
    a sealing cap for sealing against surface portions of said ferromagnetic tank structure adjacent said hole;
    an inflatable bladder for inserting within said hole; and
    valve means connected to said inflatable bladder for introducing an inflating fluid within said bladder to expand said bladder for sealing within said hole and clamping said sealing cap above said hole.

20. A sealing system according to claim 6, wherein said clamping plug assembly includes:
    a sealing cap for sealing against surface portions of said ferromagnetic tank structure adjacent said hole;
    a threaded washer mounted within said sealing cap;
    a threaded bolt having an engaging portion extending above said sealing cap, a threaded shaft portion engaging said threaded washer, and a slotted portion having a rotating arm mounted therein to rotate to a position perpendicular to said slotted portion when said slotted portion is inserted through said hole.

21. A sealing system according to claim 1, wherein said clamping plug assembly includes:
    a sealing cap for sealing against surface portions of said ferromagnetic tank structure adjacent said hole;
    a sealing grommet formed with said sealing cap for insertion within said hole, said grommet defining an internal cavity; and
    a wedge structure movable within said internal cavity and shaped to expand said grommet within said hole as said wedge structure is moved within said internal cavity to clamp said sealing cap to said tank structure while expanding said grommet within said hole.

22. A sealing system according to claim 1, wherein said clamping plug assembly includes:

a sealing cap for sealing against surface portions of said ferromagnetic tank structure adjacent said hole;

a sealing grommet formed with said sealing cap for insertion within said hole, said grommet defining an internal cavity; and a threaded washer engaging said grommet and axially aligned with said internal cavity.

23. A sealing system according to claim 1, wherein said clamping plug assembly includes:

a sealing cap for sealing against surface portions of said ferromagnetic tank structure adjacent said hole;

an inflatable bladder for inserting within said hole; and valve means connected to said inflatable bladder for introducing an inflating fluid within said bladder to expand said bladder for sealing within said hole and clamping said sealing cap above said hole.

* * * * *